Patented July 6, 1954

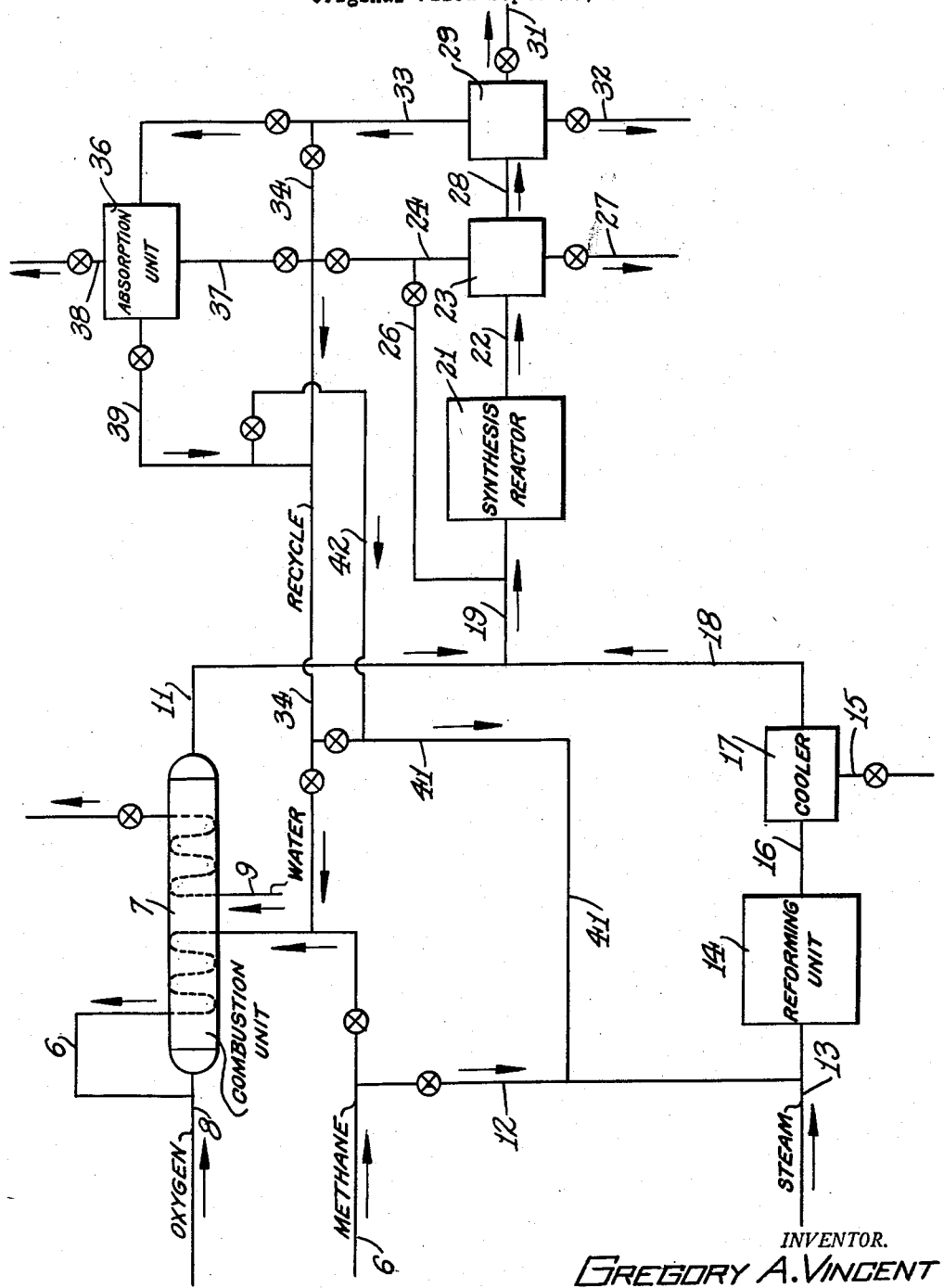

2,683,121

UNITED STATES PATENT OFFICE 2,683,121

PREPARATION OF HYDROCARBON SYNTHESIS GAS

Gregory A. Vincent, Ridgewood, N. J., assignor to The M. W. Kellogg Company, Jersey City, N. J., a corporation of Delaware Continuation of application Serial No. 776,538, September 27, 1947. This application November 28, 1951, Serial No. 258,623

8 Claims. (Cl. 252—373)

This invention relates to the synthesis of organic compounds. In one aspect this invention relates to the production of a gas rich in hydrogen, useful for the synthesis of organic compounds. In another aspect this invention relates to an integrated process involving the production of hydrogen and an oxide of carbon and the subsequent interaction of the hydrogen and the oxide of carbon in the presence of a hydrogenation catalyst to produce hydrocarbons having more than one carbon atom per molecule and oxygenated organic compounds.

This application is a continuation of my application Serial No. 776,538 filed September 27, 1947, now abandoned.

It has been known for some time that a gaseous mixture comprising hydrogen and carbon monoxide may be produced either by the partial combustion of relatively low-boiling hydrocarbons, such as methane, or by the reaction of relatively low-boiling hydrocarbons with steam and/or carbon dioxide. The partial combustion of methane as well as the reaction of carbon dioxide with methane to produce hydrogen and carbon monoxide produces these components in a relatively low ratio with respect to each other, usually in a mol ratio less than about 2:1 at temperatures between about 1800 and about 2500° F. On the other hand, the production of hydrogen and carbon monoxide by the reaction between methane and steam produces these components in a mol ratio above about 2:1 at a temperature of about 1250 to about 2400° F. Either of the above reactions may be effected with or without a catalyst. The synthesis of organic compounds from such gaseous mixtures has been effected in the presence of a catalyst, such as a metal or a metal oxide of group VIII of the periodic table. Generally the mol ratio of hydrogen to carbon monoxide for the synthesis of organic compounds is between about 1:1 and about 3:1, preferably a ratio of about 2:1. It is, therefore, desirable to provide a method for producing a synthesis feed having the preferred composition of about 2:1 mol ratio of hydrogen to carbon monoxide.

It is an object of this invention to produce a synthesis gas comprising hydrogen and carbon monoxide in a ratio of about 2:1.

It is another object of this invention to provide a continuous process for the synthesis of organic compounds from relatively low-boiling hydrocarbons.

Still another object of this invention is to provide an integrated process for the conversion of a normally gaseous hydrocarbon into normally liquid hydrocarbons.

Another object of this invention is to provide a more economic process for the synthesis of organic compounds from methane.

Other objects and advantages of the present invention will become apparent to those skilled in the art from the accompanying description and disclosure.

According to this invention, methane, or other normally gaseous hydrocarbon or mixture thereof, is converted simultaneously in separate zones to hydrogen and carbon monoxide by partial combustion with an oxygen-containing gas as the primary reaction in one zone and by direct reaction with steam as the primary reaction in a second zone. The product of the methane conversion comprising hydrogen and carbon monoxide from each zone is combined as a synthesis feed mixture and passed through a synthesis reaction zone under suitable conditions of operation and in the presence of a suitable catalyst, such as iron, to produce hydrocarbons having more than one carbon atom per molecule and oxygenated organic compounds as the principal products of the process. Unconverted reactants, carbon dioxide and methane from the synthesis reaction are recycled to one or both of the methane conversion zones, preferably to the methane reforming zone when a considerable amount of carbon dioxide is produced in the synthesis reaction zone. By effecting the synthesis of organic compounds according to this invention the efficiency of the process may be greatly increased and a synthesis feed gas of the desired composition for optimum yield of normally liquid organic compounds may be produced.

Instead of the partial combustion of methane, conversion of coal or coke with steam and oxygen may be substituted therefor without departing from the scope of this invention. The conversion of coal or coke may be effected with a moving bed of solids or with a fluidized finely divided solids process known to those skilled in the art. The effluent from the conversion of coal comprises hydrogen and carbon monoxide in a mol ratio of less than about 2:1, usually about 1:1.

It is desirable to use a synthesis feed gas having a relatively high ratio of hydrogen to carbon monoxide, such as a mol ratio of about 2:1, since the use of a feed gas having a relatively low ratio of hydrogen to carbon monoxide increases undesirable side reactions which results in contaminating the synthesis catalyst with carbon, tars, waxes and relatively high-boiling organic compounds. In this respect, the present process provides a method for producing a synthesis feed gas of the preferred composition.

For the best understanding of the present invention a description of the process according to the accompanying drawing will be undertaken.

The drawing comprises a diagrammatic illustration of an arrangement of apparatus for the manufacture of hydrocarbons having more than one carbon atom per molecule and oxygenated organic compounds from methane. The apparatus of the drawing comprises a methane combustion unit 7, a methane reforming unit 14, a synthesis reactor 21 and suitable auxiliary equipment.

According to the illustration of the present process in the drawing, methane or a methane-containing gas from any suitable source, such as natural gas, after removal of H₂S therefrom by conventional methods, is passed under pressure through conduit 6 to a combustion zone 7. Although methane is referred to specifically as the feed, the use of other gaseous hydrocarbons, such as ethane and propane, is within the scope of this invention. Oxygen or an oxygen-containing gas is passed to combustion unit 7 through conduit 8. Methane is preheated, such as by indirect heat exchange with the combustion products from the combustion zone of unit 7 as shown. Oxygen may also be preheated if desired. In combustion unit 7, methane is oxidized to hydrogen and carbon monoxide according to the typical equation shown below.

$$CH_4 + \tfrac{1}{2}O_2 \rightarrow 2H_2 + CO$$

Combustion unit 7 may comprise a pressure vessel formed of a carbon steel shell capable of withstanding the pressure of operation and protected from excessive temperature by a cast lining of a suitable refractory material, such as zirconia, including a burner fabricated of a heat resistant alloy and cooled by circulating water or steam through it.

When the source of methane is natural gas, the feed gas composition will be approximately that shown in Table I below:

*Table I*

| | Mol per cent |
|---|---|
| N₂ | 1.3 |
| CO₂ | 0.5 |
| CH₄ | 79.7 |
| C₂H₆ | 12.1 |
| C₃H₈ | 4.7 |
| C₄H₁₀ | 1.2 |
| C₅₊ | 0.5 |
| | 100.0 |

The temperature of combustion in unit 7 is between about 1700 and about 2600° F., preferably it is a temperature of about 1800 to about 1900° F. when using a catalyst, such as nickel, and a temperature of about 2350 to about 2500° F. when not using a catalyst. A pressure between about one atmosphere and about 500 pounds per square inch gage corresponding substantially to the pressure in the subsequent synthesis reaction zone is maintained in combustion unit 7. Preferably, the reaction is effected with a catalyst comprising nickel or nickel oxide supported on a heat resistant support, such as alundum. The catalyst is maintained in a stationary bed in various forms, such as pellets or granules, porous tubes of ceramic material impregnated with catalyst, or tubes of the metal catalyst. The reaction is exothermic requiring only preheating of the methane stream to effect reaction. The mol ratio of oxygen to methane entering the reaction zone is between about 0.5:1 to about 0.7:1. A reaction effluent comprising hydrogen and carbon monoxide in a mol ratio of less than about 2:1 is continuously removed from reaction unit 7 through conduit 11. Since the temperature of reaction is a function of the ratio of oxygen to methane, a specific ratio within the above range is chosen to give the desired temperature at which conversion is substantially complete and carbon formation is minimized. The specific mol ratio of hydrogen to carbon monoxide in the product from combustion unit 7 is between about 1.7:1 and about 1.9:1 when no tail gas is recycled from the synthesis reaction system. The composition of a typical reaction effluent for the partial combustion of methane is shown below in Table II and it will be understood that such composition depends upon such operating conditions as temperature, ratio of methane and oxygen, etc.

*Table II*

| | Mol per cent |
|---|---|
| N₂ | 1.8 |
| H₂ | 59.6 |
| CO | 35.1 |
| CO₂ | 2.8 |
| CH₄ | 0.7 |
| Total (dry basis) | 100.0 |
| H₂:CO ratio | 1.7:1 |

Although substantially pure oxygen is preferred as the oxidizing agent for the methane combustion, air or other oxygen-containing gas may be used also without departing from the scope of this invention. In order to recover exothermic heat of reaction liberated in the combustion zone of unit 7, indirect heat exchange of the reaction products with water to produce steam may be effected in conduit 9 as shown. The steam thus produced may be used for producing power, for heating purposes or may be used in the reaction between methane and steam to be described more fully hereinafter.

Steam formed by the partial combustion of methane in unit 7 may be removed from the effluent in conduit 11 by cooling the effluent and condensing the steam therefrom, if desired.

Simultaneously, with the production of hydrogen and carbon monoxide in combustion unit 7, methane is continuously passed from conduit 6 through conduit 12 to reforming unit 14. Steam is introduced into reforming unit 14 through conduit 13. Heat is supplied to reforming unit 14 by the combustion of a fuel in indirect heat exchange with the mixture of steam and methane to produce a temperature between about 1400 and about 1600° F. Reforming unit 14 comprises a conventional tubular reforming furnace of the type known to those skilled in the art, with catalyst in the reaction tubes. The pressure of the reaction mixture of methane and steam in the tubes of the reforming furnace 14 is usually below about 100 pounds per square inch gage and is preferably between about 15 and about 50 pounds per square inch gage. The ratio of steam to methane in the feed mixture to the reforming unit 14 is about 2 mols of steam per mol of methane, although higher ratios may be used without departing from the scope of this invention. Carbon dioxide may be employed to replace a portion of the steam used, such as by recycling tail gas or carbon dioxide from the synthesis reaction. For example, one mol of steam and one mol of carbon dioxide may be employed per mol of methane. Typical equations for the reaction of methane with steam and carbon dioxide are shown below:

$$CH_4 + H_2O \rightarrow CO + 3H_2$$
$$CH_4 + CO_2 \rightarrow 2CO + 2H_2$$

The interaction of methane with steam or carbon dioxide is effected in the presence of a suitable catalyst in reforming unit 14. A suitable reforming catalyst may comprise nickel or nickel oxide supported on alumina or other supporting material, such as, for example, a catalyst containing in parts by weight 1 NiO, 0.2 $Cr_2O_3$, 1.68 $SiO_2$, 0.9 MgO. Other reforming catalysts comprise molybdenum, cobalt and chromium and their oxides and sulfides. The catalyst is maintained in a stationary bed of relatively small pieces of solid material in the tubes. A regenerative type reformer furnace constructed of ceramic material may be used instead of the aforementioned tubular type furnace. With a regenerative type furnace heated at intervals by direct contact with combustion gases, temperatures as high as 2400° F. are possible, which high temperature obviates the necessity of a catalyst. A gaseous effluent comprising hydrogen and carbon monoxide in a mol ratio greater than about 2:1, usually about 4:1 with no recycle and about 3:1 with recycle of tail gas or carbon dioxide, is removed from reforming unit 14 through conduit 16. Such a gaseous effluent has approximately a composition as shown in Table III below when natural gas is the source of methane. It will be understood that the composition of the effluent will depend upon the reforming operating conditions, such as temperature, space velocity, steam to methane ratio, etc.

*Table III*

|   | No Recycle, mol percent | Recycle, mol percent |
|---|---|---|
| $N_2$ | 0.3 | 1.2 |
| $H_2$ | 73.5 | 67.2 |
| CO | 18.1 | 23.6 |
| $CO_2$ | 6.3 | 7.1 |
| $CH_4$ | 1.8 | 0.9 |
| Total (Dry Basis) | 100.0 | 100.0 |

The effluent in conduit 16 is passed through a cooler 17 for cooling the effluent to a temperature below about 200° F. to condense the steam in the effluent, which steam is removed as condensate from cooler 17 through conduit 15. Usually the effluent is cooled to a temperature of about 100° F. before compressing. From cooler 17 the reforming unit effluent is continuously passed through conduit 18 and compressed, if necessary, by a compressor (not shown) and then combined with the effluent of combustion unit 7 leaving conduit 11. The resulting mixture from conversion units 7 and 14 is continuously passed through conduit 19 to a conventional synthesis reactor 21.

Synthesis reactor 21 may comprise any of several types of conventional reaction chambers, such as fixed bed or fluid bed reaction units, known to those skilled in the art, and may comprise several reactors in series or in parallel. The combined synthesis feed in conduit 19 comprises hydrogen and carbon monoxide in a mol ratio of 2:1 or thereabouts. This feed is passed through synthesis reactor 21 in contact with a suitable catalyst, such as iron or other metal or metal oxide of group VIII of the periodic table, under conditions of reaction such that hydrocarbons having more than one carbon atom per molecule and oxygenated organic compounds are produced as products of the process. The temperature of reaction in synthesis reactor 21 is usually between about 300 and about 700° F. and a pressure is maintained between about atmospheric and about 500 pounds per square inch gage, preferably between about 100 and about 300 pounds per square inch gage. When employing an iron or iron oxide catalyst, a temperature between about 450 and about 650° F. is appropriate. When employing a cobalt catalyst a temperature below 450° F. is employed. Sufficient contact time of reactants and reaction products with the catalyst material is afforded in reactor 21 to form the desired products of the process. Usually, a contact time of gases with catalyst of about 2 to 20 seconds is appropriate.

A reaction effluent comprising hydrocarbons, oxygenated organic compounds, steam, carbon dioxide and unreacted reactants including some methane from the synthesis gas, is removed from reactor 21 through conduit 22 and passed to a primary condensation unit 23. Condensation unit 23 comprises a conventional condenser and accumulator and auxiliary equipment for partial condensation of the effluent. Unit 23 comprises a single or a series of condensation units and accumulators. The temperature of the effluent in condensation unit 23 is reduced to about 300° F. or lower and the effluent in condensation unit 23 is maintained at substantially the same pressure as that existing in reactor 21. The cooling of the effluent results in the formation of either one or two liquid phases in primary condensation unit 23. These liquid phases comprise a lighter hydrocarbon-rich phase and a heavier water-rich phase containing dissolved oxygenated organic compounds. Gases comprising hydrogen and/or carbon monoxide and including methane and carbon dioxide are removed from condensation unit 23 through conduit 24 and may be recycled to synthesis reactor 21 through conduit 26 in order to supplement the composition with respect to any component of the synthesis feed in conduit 19 and to alter the ratio of hydrogen to carbon monoxide in reactor 21. When formed, the water-rich phase in primary condensation unit 23 is removed therefrom through conduit 27 and may be passed to subsequent conventional separation and recovery equipment (not shown) for the removal of dissolved oxygenated organic compounds therefrom as products of the process.

A portion or all of the uncondensed components of the effluent from reactor 21 and the liquid hydrocarbon-rich phase are removed from condensation unit 23 through conduit 28 and passed to a secondary condensation unit 29 which may comprise a conventional lean oil circulating system known to those skilled in the art. Condensation unit 29 also comprises suitable condensers and accumulators for further condensation and accumulation of reaction products. The temperature of condensation unit 29 is maintained below about 100° F. and a pressure is maintained substantially equivalent to the pressure existing in synthesis reactor 21. Pressures higher than the pressures existing in reactor 21 and condenser 23 and/or refrigeration may be employed in connection with unit 29 without departing from the scope of this invention. In condensation unit 29 further condensation of the gaseous components is effected and an organic condensate is removed therefrom through conduit 31 and passed to subsequent conventional separation and recovery equipment (not shown) for the recovery of products of the process. Any water condensed in condensation unit 29 is withdrawn therefrom through conduit 32. Uncondensed components of the reaction effluent comprising hydrogen and/or carbon monoxide, carbon dioxide, methane and unrecovered hydrocarbons heavier than methane, are removed from condensation unit 29 through conduit 33 and are recycled in whole or in part to conduit 12 and reforming unit 14 by means of recycle conduits 34 and 41. A portion or all of the gases or vapors from the primary condensation unit 23 may also be recycled to reforming unit 14 through conduits 24, 34, 41 and 12. Recycling of gases from condensation units 23 and 29 to reforming unit 14 is desirable in order to utilize the methane and carbon dioxide content of the gases for production of additional synthesis gas.

Recycling of at least a portion of the recycle gases to reforming unit 14 is particularly desirable when the synthesis reaction is effected in the presence of an iron or an iron oxide catalyst since with such a catalyst the synthesis reaction effluent contains appreciable amounts of carbon dioxide. With a reduced iron catalyst the composition of synthesis reaction effluent may comprise as much as 20 to 50 volume per cent carbon dioxide. As previously discussed, carbon dioxide reacts with methane, and, therefore, recycling of the carbon dioxide-rich gases to reforming unit 14 is particularly desirable and results in a higher methane conversion at given conditions and in a lower endothermic reaction duty per unit of carbon monoxide manufactured as compared with the use of steam and methane alone.

In some instances where the carbon dioxide content of the recycle gases is relatively low, such as below about 20 per cent, and the pressure existing on the recycle gases is approximately the same or higher than in combustion unit 7, a portion of the recycle gases is conveniently and advantageously recycled to unit 7 to utilize the pressure of the gases by avoiding compression of the recycle gases and their methane and hydrogen content.

The pressure of the recycle gases is substantially the same as the pressure existing in synthesis reactor 21 which is usually under a pressure substantially the same as that in combustion unit 7, except for the additional pressure needed to induce flow through the system. If the pressure in combustion unit 7 is lower than that of the recycled gases, the pressure may be decreased by expansion into conduit 6 in which case compression will be effected in conduit 11 or 19 by means not shown. However, if the pressure of the recycle gases is lower than the pressure existing in combustion unit 7 as will usually be the case, a suitable compressor (not shown) must be provided in conduit 34 for raising the pressure of the recycle gases to the pressure existing in combustion unit 7. Combustion unit 7 may be operated at substantially the same pressure as synthesis reactor 21 with no compression of the combustion unit effluent and in this manner of operation only a relatively small amount of compression of the recycled gases is necessary.

The recycled gases in conduit 34 can be passed in entirety either to combustion unit 7, or preferably to reforming unit 14, as will be most efficient and economical under conditions of operation, or the recycling gases in conduit 34 may be divided and a portion passed to combustion unit 7 and the other portion passed to reforming unit 14.

A typical composition of recycle gases is illustrated in Table IV below when using an iron synthesis catalyst and when recycling to reforming unit 14.

*Table IV*

| | Mol per cent |
|---|---|
| $N_2$ | 2.4 |
| $H_2$ | 47.4 |
| CO | 6.3 |
| $CO_2$ | 32.3 |
| $CH_4$ | 8.5 |
| $C_2+$ | 3.1 |
| Total | 100.0 |

As is evident from the above typical composition a considerable amount of hydrogen and combined carbon is present in the recycle gases. The presence of such components is a readily available source of synthesis feed gas ($CO+H_2$) and, thus, the recycle of the normally gaseous components of the synthesis effluent to the methane conversion units is desirable. The hydrogen in the recycle gases is not only a source of hydrogen for the synthesis reaction, but is known to decrease carbon or coke formation during partial combustion of methane, such as is effected in combustion unit 7.

It is to be understood that the ratio of hydrogen to carbon monoxide in the combined synthesis feed gas is a function of both the total quantity of hydrogen and carbon monoxide in each separate gas stream and the ratio of hydrogen to carbon monoxide in each separate gas stream, from combustion unit 7 and reforming unit 14. The total quantity of hydrogen and carbon monoxide produced is a function of the quantity of raw materials freshly introduced and introduced by way of the recycle gases. In order to obtain a combined synthesis gas of a particular composition, the total quantity of hydrogen and carbon monoxide produced in each conversion zone is adjusted with relation to the ratio of hydrogen to carbon monoxide in the product streams from each conversion zone. To some extent the composition of the synthesis feed gas can be regulated for a given total quantity of hydrogen and carbon monoxide produced in each conversion zone by adjusting the hydrogen to carbon monoxide ratio within the aforementioned ranges of the separate streams from the conversion zones.

In order to prevent the build-up of nitrogen in the system, particularly when using air as a source of oxygen for combustion unit 7 or when it is desirable to recycle $CO_2$ alone or in a higher concentration to reforming unit 14, a portion of the recycle gases is continuously or intermittently passed to a carbon dioxide absorption unit 36 through conduits 24 and 37 or conduit 33. In absorption unit 36 the gases are contacted with a suitable solvent for the removal of carbon dioxide therefrom in the conventional manner. Such solvents may comprise monoethanolamine or other ethanol amines. Nitrogen and other unabsorbed gases, such as methane, are removed from absorption unit 36 through conduit 39 and vented to the atmosphere or used as fuel. Carbon dioxide is recovered from the rich solvent by stripping, by reducing the total pressure, or by heating, and then the resulting lean solvent is returned for the absorption of more carbon dioxide. The desorbed carbon dioxide is removed from absorption unit 36 through conduit 39 and returned to recycle conduit 34 to be combined with recycle gases therein for return to either combustion unit 7 or reforming unit 14, or recycled directly to reforming unit 14 through conduits 42 and 41.

Certain valves, coolers, heaters, accumulators, distillation columns, pumps, etc. have been omitted from the drawings as a matter of convenience and their use and location will become obvious to those skilled in the art. The lengths of the conduits of the drawings are not proportional to the distance travelled but are merely diagrammatical. It is not intended to limit any particular location of inlets and outlets as shown in the drawings. The examples of composition of gases and theory in connection with this invention are offered as illustration and should not be construed to be unnecessarily limiting to the invention.

Various modifications and alterations of the process of the present invention may become apparent to those skilled in the art without departing from the scope of this invention. For example, different hydrocarbons may be converted in each reaction zone and the reaction effluent combined to produce a synthesis gas of the desired composition. Accordingly, in one modification propane is the major component of the feed stream to combustion unit 7 and methane is the major component of the feed to reforming unit 14. The effluents from each conversion zone have a different composition and these effluents are combined to produce a synthesis gas of the desired composition. A convenient and readily available source of propane for such a modification is from the synthesis reaction effluent itself.

I claim:

1. A process for the preparation of a hydrocarbon synthesis feed gas which comprises introducing a normally gaseous hydrocarbon from an external source into two separate conversion zones arranged in parallel, reacting the hydrocarbon with steam in the first conversion zone under reforming conditions to produce a gaseous effluent comprising hydrogen and carbon monoxide in a relatively high mol ratio, simultaneously reacting the hydrocarbon with free oxygen in a second conversion zone under partial combustion conditions to produce a gaseous effluent comprising hydrogen and carbon monoxide in a relatively low mol ratio, simultaneously introducing into one of said conversion zones a recycle product stream containing hydrogen and combined carbon of an effluent from a synthesis reaction for the production of hydrocarbons from carbon monoxide and hydrogen, and combining the effluents from said conversion zones to produce a hydrocarbon synthesis feed gas.

2. A process for the preparation of a hydrocarbon synthesis feed gas which comprises introducing a normally gaseous hydrocarbon from an external source into two separate conversion zones arranged in parallel, reacting the hydrocarbon with steam in the first conversion zone under reforming conditions to produce a gaseous effluent comprising hydrogen and carbon monoxide in a mol ratio greater than about 2:1, simultaneously reacting the hydrocarbon with free oxygen in a second conversion zone under partial combustion conditions to produce a gaseous effluent comprising hydrogen and carbon monoxide in a mol ratio less than about 2:1, simultaneously introducing into one of said conversion zones a recycle product stream containing hydrogen and combined carbon of an effluent from a synthesis reaction for the production of hydrocarbons from carbon monoxide and hydrogen and combining the effluents from said conversion zones to produce a hydrocarbon synthesis feed gas.

3. A process for the preparation of a hydrocarbon synthesis of feed gas which comprises introducing a normally gaseous hydrocarbon from an external source into separate reforming and combustion zones arranged in parallel; reacting at relatively low pressure under reforming conditions steam, said gaseous hydrocarbon and a recycle product stream containing hydrogen and carbon dioxide of an effluent from an iron-catalyzed synthesis reaction for the production of hydrocarbons from carbon monoxide and hydrogen to produce in the reforming zone a gaseous mixture comprising hydrogen and carbon monoxide in a mol ratio greater than about 2:1; simultaneously reacting said gaseous hydrocarbon with free oxygen in the combustion chamber at relatively high pressure under partial combustion conditions to produce a gaseous mixture comprising hydrogen and carbon monoxide in a mol ratio less than about 2:1, and combining the effluents from the reforming and combustion zones to produce a hydrocarbon synthesis feed of the desired hydrogen-carbon monoxide mol ratio.

4. A process for the preparation of a hydrocarbon synthesis feed gas which comprises introducing a normally gaseous hydrocarbon from an external source into separate reforming and combustion zones arranged in parallel; reacting steam, said gaseous hydrocarbon and at least a portion of a recycle product stream containing hydrogen and carbon dioxide of an effluent from a synthesis reaction for the production of hydrocarbons from carbon monoxide and hydrogen to produce in the reforming zone a gaseous mixture comprising hydrogen and carbon monoxide in a mol ratio greater than about 2:1 at a temperature between about 1250 and about 2400 degrees Fahrenheit under a pressure between atmospheric and about 100 pounds per square inch gage; simultaneously reacting said gaseous hydrocarbon with free oxygen in the combustion zone under partial combustion conditions at a temperature between about 1700 and about 2600 degrees Fahrenheit under superatmospheric pressure to produce a gaseous mixture comprising hydrogen and carbon monoxide in a mol ratio less than about 2:1, and combining the effluents from the reforming and combustion zones to produce a hydrocarbon synthesis feed gas of the desired hydrogen-carbon monoxide mol ratio.

5. A process according to claim 4 in which the normally gaseous hydrocarbon is methane.

6. A process for the preparation of a hydrocarbon synthesis feed gas which comprises introducing methane from an external source into separate and reforming combustion zones arranged in parallel; reacting steam, methane and a recycle product stream containing hydrogen and carbon dioxide of an effluent from an iron-catalyzed synthesis reaction for the production of hydrocarbons from carbon monoxide and hydrogen to produce in the reforming zone a gaseous mixture comprising hydrogen and carbon monoxide in a mol ratio greater than about 2:1 at a temperature between about 1250 and about 2400 degrees Fahrenheit under a pressure between atmospheric and about 100 pounds per square inch gage; simultaneously reacting the methane with free oxygen in the combustion chamber under partial combustion conditions at a temperature between about 1700 and about 2600 degrees Fahrenheit under superatmospheric pressure to produce a gaseous mixture comprising hydrogen and carbon monoxide in a mol ratio less than about 2:1, and combining the effluents from the reforming and combustion zones to produce a hydrocarbon synthesis feed gas of the desired hydrogen-carbon monoxide mol ratio.

7. A process for the production of a hydrocarbon synthesis feed gas which comprises reacting a hydrocarbon gas from an external source containing propane as the major component with free oxygen in a first conversion zone under partial combustion conditions to produce a gaseous mixture comprising hydrogen and carbon monoxide in a relatively low mol ratio, simultaneously reacting a hydrocarbon gas from an external source containing methane as the major component with steam in a separate second conversion zone under reforming conditions to produce a gaseous mixture comprising hydrogen and carbon monoxide in a relatively high mol ratio, simultaneously introducing into one of said conversion zones propane obtained from an effluent of a synthesis reaction for the production of hydrocarbons from carbon monoxide and hydrogen, and combining the effluents from said conversion zones to produce a hydrocarbon synthesis feed gas.

8. A process for the preparation of a hydrocarbon synthesis feed gas which comprises introducing a normally gaseous hydrocarbon from an external source into separate reforming and combustion zones arranged in parallel; reacting steam, said gaseous hydrocarbon and a recycle product stream containing hydrogen and carbon dioxide of an effluent from a synthesis reaction for the production of hydrocarbons from carbon monoxide and hydrogen from which water and organic compounds having a $C_3$ and higher carbon content have been removed in the reforming zone at a temperature between about 1250 and about 2400 degrees Fahrenheit, under a pressure between atmospheric and about 100 pounds per square inch gage to produce a gaseous effluent comprising hydrogen and carbon monoxide in a mol ratio greater than about 2:1; simultaneously reacting in the combustion zone under partial combustion conditions at a temperature between about 1700 and about 2600 degrees Fahrenheit and a superatmospheric pressure free oxygen with said gaseous hydrocarbon to produce a gaseous effluent comprising hydrogen and carbon monoxide in a mol ratio less than about 2:1, and combining the effluents of the reforming and combustion zones to produce a synthesis feed gas of the desired hydrogen-carbon monoxide mol ratio.

References Cited in the file of this patent

UNITED STATES PATENTS

| Number | Name | Date |
|---|---|---|
| 2,270,897 | Roberts, Jr., et al. | Jan. 27, 1942 |
| 2,274,064 | Howard et al. | Feb. 24, 1942 |
| 2,324,172 | Parkhurst | July 13, 1943 |
| 2,541,657 | Lynch | Feb. 13, 1951 |